United States Patent [19]
Herring

[11] 3,881,273
[45] May 6, 1975

[54] HOOK AND LEADER STORAGE STRUCTURE

[76] Inventor: John Luther Herring, 2626 S. 48th Ter., Kansas City, Kans. 66106

[22] Filed: July 30, 1973

[21] Appl. No.: 383,528

[52] U.S. Cl. ............................................. 43/57.5 R
[51] Int. Cl. ............................................ A01k 97/06
[58] Field of Search ..................... 43/57.5 R, 57.5 A

[56] References Cited
UNITED STATES PATENTS

| | | | |
|---|---|---|---|
| 885,511 | 4/1908 | Newsome | 43/57.5 R |
| 891,103 | 6/1908 | Schaney | 43/57.5 R |
| 1,999,779 | 4/1935 | Perrine | 43/57.5 R |
| 2,659,997 | 11/1953 | Guestinger | 43/57.5 A |
| 3,310,905 | 3/1967 | Davis et al. | 43/57.5 R |
| 3,507,071 | 4/1970 | Bryson | 43/57.5 R |

FOREIGN PATENTS OR APPLICATIONS

| | | | |
|---|---|---|---|
| 4,786 | 1901 | United Kingdom | 43/57.5 R |

*Primary Examiner*—Louis G. Mancene
*Assistant Examiner*—Daniel J. Leach
*Attorney, Agent, or Firm*—Fishburn, Gold & Litman

[57] ABSTRACT

A structure for storage of fishing hooks and leader lines attached thereto in spaced relation wherein the structure includes a container having sections with compartments positioned in overlying relation one with the other when closed. Each compartment has therein a hook supporting member for supporting a respective plurality of spaced fishing hooks and leader line engaging and retaining members spaced from the respective hook supporting member. A partition separates the sections and the partition and sections are hingedly connected together.

3 Claims, 7 Drawing Figures

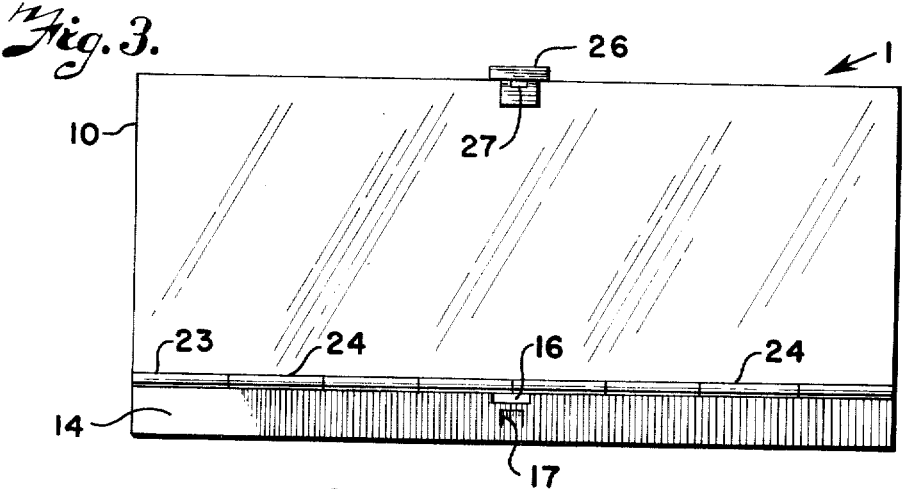
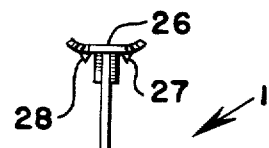
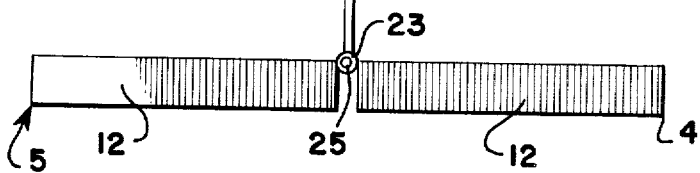
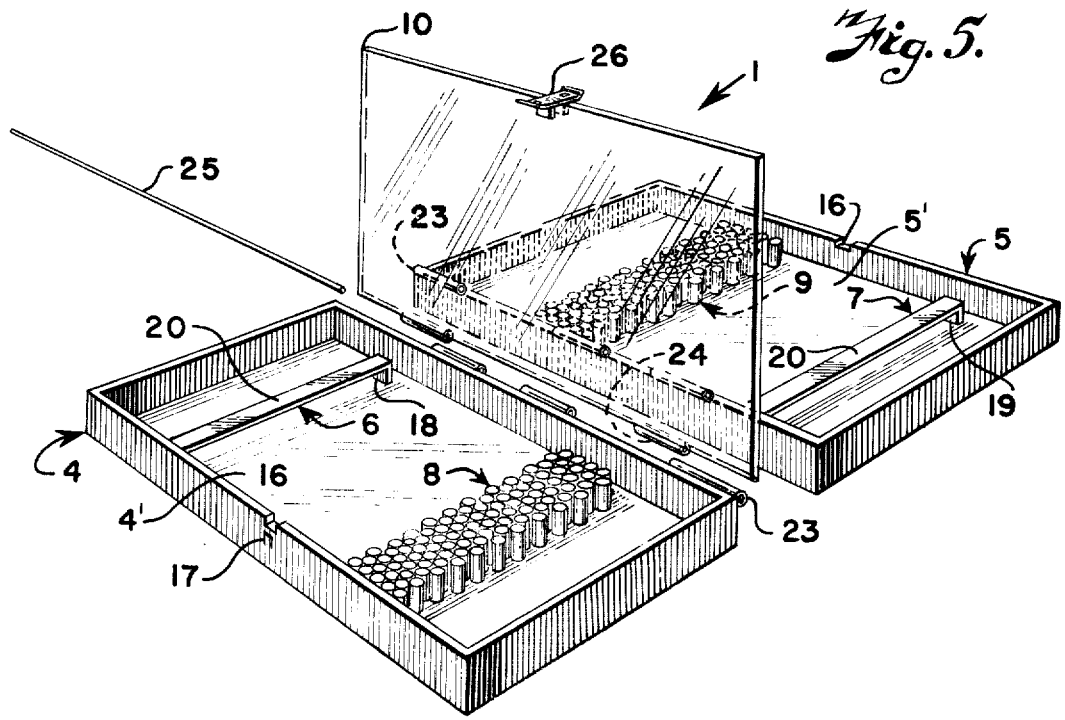

HOOK AND LEADER STORAGE STRUCTURE

The present invention relates to an improvement in storage structures for fishing hooks and their leader lines and more particularly, to a holder or container for carrying a plurality of spaced hooks and their attached leader lines.

The principal objects of the present invention are: to provide a hook and leader storage structure adapted to store and transport a plurality of spaced fishing hooks and their attached leader lines and which will prevent entanglement of the hooks and leader lines; to provide such a hook and leader storage structure which will hold the hooks and their leader lines in spaced apart and substantially parallel relation thereby permitting the leaders to dry more readily, evenly and straight; to provide such a structure which is adapted to hold and retain a plurality of hooks and leaders attached thereto in such a manner that each and every one of the hooks and the respective attached leader may be selectively removed from the storage structure as needed without disturbing the remaining leaders or hooks; to provide such a structure which is relatively small and light of weight and which may be, therefore, easily carried by one hand or in the pocket of a fisherman; to provide such a structure which will substantially securely retain the hooks and their leader lines therein in a safe manner and thereby preclude accidently snagging of the barbed ends of the hooks in the fisherman's clothing or flesh; to provide such a structure which provides ready access thereto by a fisherman so that he may easily transport and store fishing hooks and their attached leader lines about his person and may have them readily available when needed in fishing; and to provide such a hook and leader storage structure which is economical to manufacture, attractive in appearance, durable in construction, and particularly well adaptd for the purposed use.

The present invention accomplishes these and other objects by providing a pair of comparatively shallow, rectangular trays or sections and a partition therebetween all of which are cooperatively hingedly connected together along one longitudinal side thus forming a container or case. A latch is mounted on the partition and engages another longitudinal side of the sections for retaining the storage structure in a closed position. At least one of the trays or sections is provided with hook supporting members and leader lines retaining members spaced therefrom for engaging and holding the hooks and leaders in spaced substantially parallel relation.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features of the hook and leader storage structure.

FIG. 3 is a side elevational view of the hook and leader storage structure shown with the components in position for use.

FIG. 4 is an end elevational view of the hook and leader storage structure shown with the components thereof in position for use.

FIG. 5 is an exploded perspective view of the hook and leader storage structure.

Figure 1:
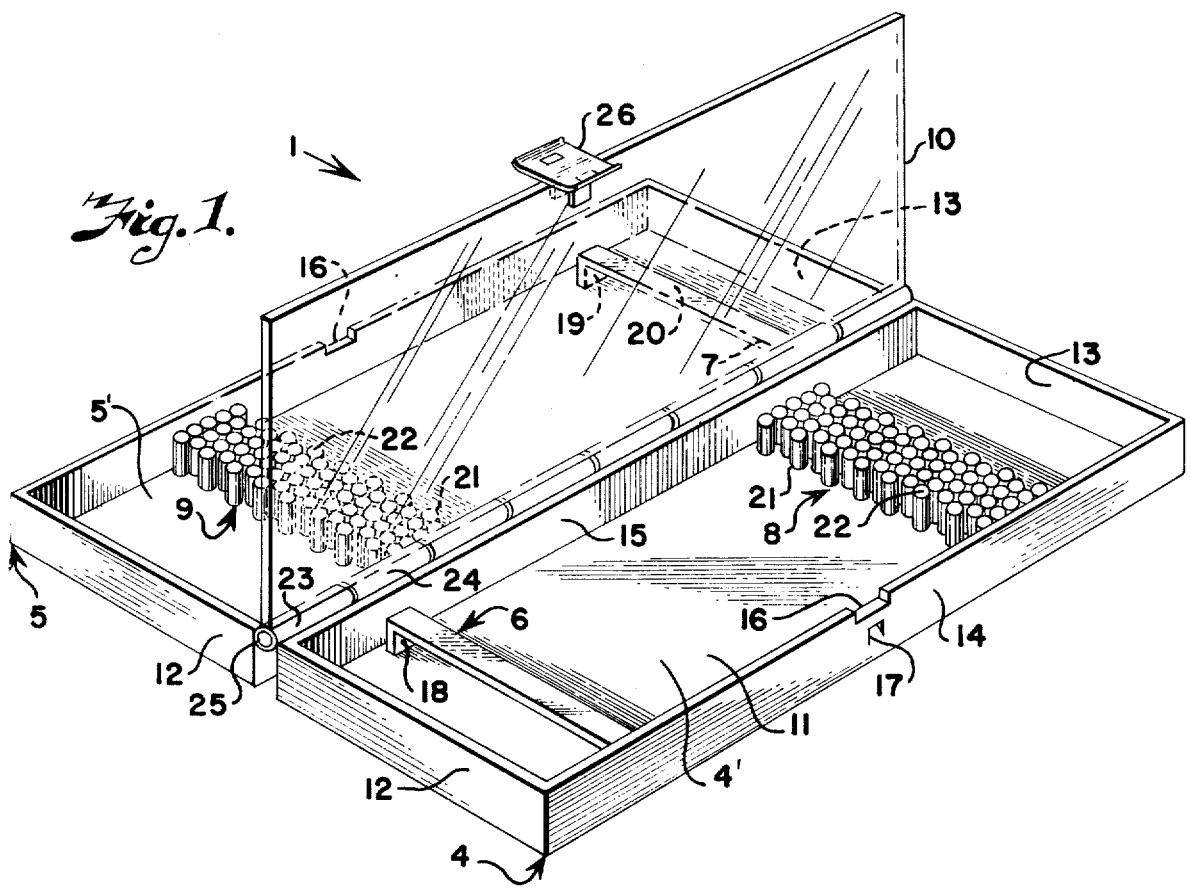
FIG. 1 is a perspective view of a hook and leader storage structure embodying features of the present invention and shown with components thereof in position for use.
Figure 2:
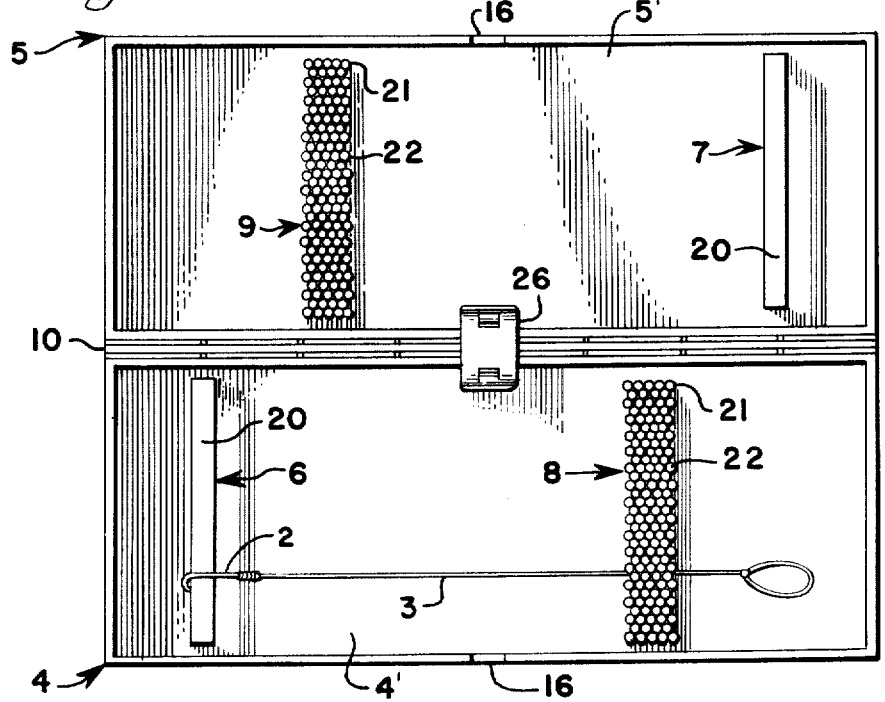
FIG. 2 is a top plan view of the hook and leader storage structure.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a structure for storage of fishing hooks 2 and leader lines 3 attached to respective fishing hooks 2 with the hooks 2 and the leader lines 3 being in spaced relation. The hook and leader storage structure 1 includes sections 4 and 5 having compartments 4' and 5' therein, said sections being positioned in overlying relation one with the other and at least one of the sections having therein a hook supporting member and in the illustrated structure, the sections 4 and 5 have hook supporting members 6 and 7 respectively for supporting a respective plurality of spaced fishing hooks. At least one of the sections has leader line engaging and retaining means therein and spaced from the hook supporting member in the respective section. The illustrated compartments 4' and 5' have leader line engaging and retaining members 8 and 9 respectively fixed therein and spaced from the respective hook supporting members 6 and 7. A partition 10 separates the compartments 4' and 5' and the partition 10 and the sections 4 and 5 are hingedly connected together.

The sections 4 and 5 are preferably identical except reversed and one section will be described in detail to avoid needless repetition. Each section has an outer wall 11 which is a generally planar member and rectangular in shape. Longitudinally spaced end walls 12 and 13 extend from opposite ends of the outer wall 11. The end walls 12 and 13 are also generally planar members and rectangular in shape. Laterally spaced side walls or front and rear walls 14 and 15 extend from opposite side edges of the outer wall 11 and are generally planar and rectangular in shape. The end walls 12 and 13 and the front and rear walls 14 and 15 cooperate to form an open top compartment.

A notch 16 is formed in an upper or free edge of the front wall 14, for purpose later described, of each of the compartments 4' and 5'. A recess 17, also for a purpose later described, is formed in an exterior surface of the front wall 14 of each of the compartments 4' and 5'.

The partition 10 is illustrated as a generally planar member which is rectangular in shape and has respective edge portions thereof adapted to overlie the free edge of the end walls 12 and 13 and the front and rear walls 14 and 15 of the sections 4 and 5 to thereby selectively close same.

The hook supporting member 6 in the first or base section 4 and the hook supporting member 7 in the second or top section 5 are illustrated as being identical and each includes laterally spaced support posts 18 and 19 extending from the outer wall 11 and positioned adjacent the front and rear walls 14 and 15 respectively. A rack 20 extends between the support posts 18 and 19 and the rack 20 may be in any desired shape adapted to support a plurality of fishing hooks 2 in spaced relation thereon. The illustrated rack 20 is a planar member adapted to support the shank portion of the fishing hooks 2 with a barbed end positioned between the outer wall 11 and the rack 20.

The leader line retaining member 8 in the first section 4 and the leader line retaining member 9 in the second section 5 are also illustrated as being substantially identical and each includes a plurality of laterally spaced rows 21 of longitudinally spaced flexible posts 22 each extending from the outer wall 11. The rows 21 of posts 22 are spaced from the respective rack 20 to thereby separate the respective section into a center compartment or space and opposite end compartments or spaces. The rows 21 of the posts 22 are in close proximity one with the other and the spacing therebetween is preferably equal to or slightly greater or less than the thickness of the leader lines 3 to be positioned therebetween.

The first and second sections 4 and 5 and the partition 10 are hingedly connected together in a manner to permit moving the sections 4 and 5 between an open position and a closed position and to permit moving the partition 10 between a position closing either of the sections 4 and 5 and a position spaced from the sections 4 and 5 when same are in an open position.

In the illustrated structure, a plurality of spaced tubular members 23 extend outwardly from a free edge of the rear wall 15 of the sections 4 and 5. The tubular members 23 on the rear wall 15 of the first section 4 are longitudinally aligned with the tubular members 23 extending from the rear wall 15 of the second section 5. The partition 10 has a plurality of longitudinally spaced tubular members 24 extending outwardly from one longitudinally edge thereof and the tubular members 24 are longitudinally aligned with the tubular members 23 extending from the rear wall 15 of the first and second sections 4 and 5.

The tubular members 23 and the tubular members 24 are arranged such that tubular members extend substantially the full length of the hook and leader storage structure 1 and are adapted to receive an elongated pin 25 whereby the partition 10 and the first and second sections 4 and 5 respectively are mounted for hinged movement one relative to the other.

The partition 10 has means thereon which are engageable with the front wall 14 of the first section 4 and the front wall 14 of the second section 5 for retaining same in a closed position. In the illustrated structure, a catch member 26 is mounted on the partition 10 and is positioned at the longitudinal center of the longitudinal edge opposite the edge having the tubular members 24 thereon. The catch member 26 has portions extending transversely to the partition 10 and projections 27 and 28 respectively thereon which are adapted to be received in the recess 17 in the front wall 14 of the first section 4 and in the recess 17 in the front wall 14 of the second section 5.

The first and second sections 4 and 5 are preferably formed of a suitable plastic by molding and preferably in the same mold whereby the sections 4 and 5 are identical and the outer wall 11, end walls 12 and 13, front and rear walls 14 and 15, respective hook supporting member, respective leader line engaging and retaining member, and tubular members 23 are integral. The partition 10 is preferably formed of a clear or transparent plastic and is preferably molded whereby the tubular members 24 are integral with the partition 10.

In the assembly of a hook and leader storage structure 1 constructed as illustrated and described, identical structures defining the first and second sections 4 and 5 are positioned with the respective rear walls 15 thereof adjacent and with the tubular members 23 extending therefrom and in offset relation and longitudinally aligned. The partition 10 is moved to a position having the tubular members 24 thereon longitudinally aligned with the tubular members 23 on the rear wall 15 of the first and second sections 4 and 5. The pin 25 is then inserted through the tubular members 23 and 24.

In using a hook and a leader storage structure constructed as illustrated and described, the hooks 2 are laterally spaced along the rack 20 in each of the sections 4 and 5. The hooks 2 have a shank portion thereof engaging the outer surface of the rack 20 and a barbed end positioned between the rack 20 and the respective outer wall 11. The leader lines 3 extending from the hooks 2 are positioned between respective adjacent rows 21 of posts 22 and loops in the end of the leader lines 3 are placed in the space or compartment between the respective leader line retaining member and the adjacent end wall. The sections 4 and 5 may be moved to a position in overlying relation with the partition 10 therebetween. The catch member 26 has the projections 27 and 28 received in the recesses 17 in the respective front wall 14 of the sections 4 and 5 thereby closing the structure 1. When a hook and its leader line are to be removed from the structure 1, the desired one of the sections 4 of 5 is moved to a position spaced from the partition 10. The hook 2, leader line 3, and loop thereon are removed from the respective section without disturbing the remaining hooks and the structure 1 is again closed.

While the hook and leader storage structure has been illustrated and described as being formed of two identical sections, it is to be understood that one of the sections may be as described and the other section may be adapted to store and retain fishing lures and other fishing devices and supplies, such as sinkers, bobbers, and the like. When the sections are in an open position, the partition 10 is adapted to selectively cover or close either the section constructed as illustrated and described or the section adapted to store and retain fishing lures and other fishing devices and supplies while placing items in or removing items from the uncovered section.

Figure 6:
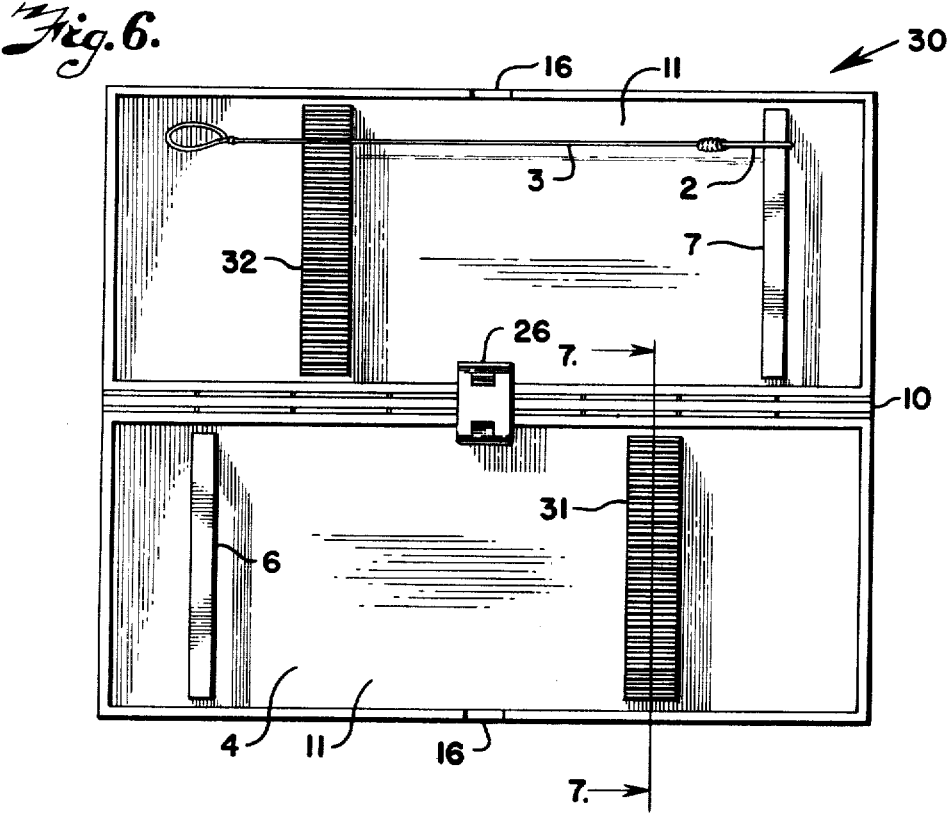
FIG. 6 is a top plan view of a modified hook and leader storage structure.
Figure 7:
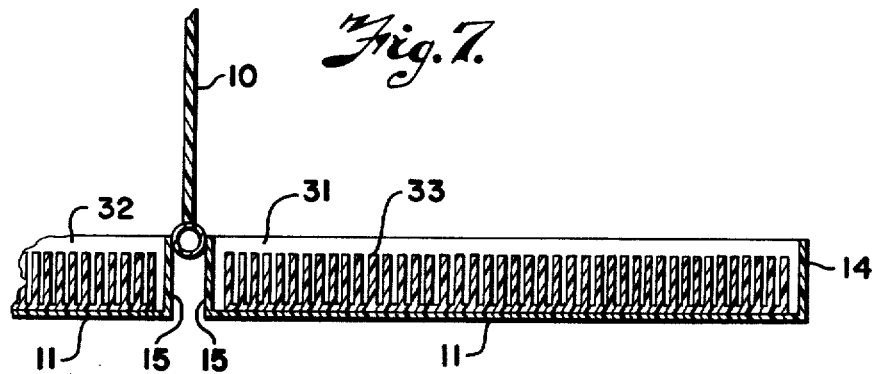
FIG. 7 is a transverse sectional view taken on line 7—7 in FIG. 6, and showing leader line engaging and retaining members.

FIGS. 6 and 7 illustrate a modified hook and leader storage structure 30 having modified leader line retaining members 31 and 32 in the first and second sections 4 and 5 respectively. The leader line retaining members 31 and 32 each comprise a respective laterally extending member in the first and second sections respectively and each laterally extending member has a plurality of laterally spaced longitudinally extending flexible fins 33 positioned in close proximity one with the other and preferably having a spacing therebetween equal to or slightly greater or less than the thickness of a respective leader line 3 to be received therebetween.

Assembly and use of the modified hook and leader storage structure 30 is substantially similar to assembly and use of the hook and leader storage structure 1.

It is to be understood that while I have illustrated and described certain forms of my invention, it is not to be limited to these specific forms or arrangement of parts herein described and shown.

What I claim and desire to secure by Letters Patent is:

1. A hook and leader storage structure comprising:
   a. a container having an outer wall and wall means extending therefrom, said wall means comprising laterally spaced front and rear walls and a pair of longitudinally spaced end walls each extending from said outer wall and each having a free edge;
   b. means mounted on said wall means for selectively covering and uncovering said container, said means for covering and uncovering said container being movably mounted on said rear wall and movable to a position overlying the free edge of each of said front and rear walls and said end walls;
   c. means in said container and spaced from said wall means for supporting a plurality of spaced fishing hooks, said means for supporting fishing hooks being positioned adjacent and spaced from one of said container end walls and comprising a bar extending transversely of said container and positioned substantially parallel with the one of said container end walls, said bar being adapted to support a shank portion of each fishing hook with a barbed portion thereof positioned between said container outer wall and said bar;
   d. means in said container and spaced from said hook supporting means therein for engaging and retaining a plurality of leader lines each attached to a respective one of the fishing hooks, said means for engaging and retaining leader lines comprises a plurality of laterally spaced rows of longitudinally spaced flexible posts extending from said outer wall, said rows being in close proximity one with the other, each of said rows having a plurality of posts, said posts in each of said rows each being in longitudinally staggered relation with adjacent posts in adjacent rows of posts, said posts in adjacent staggered rows of posts each being positioned to be engaged by a leader line positioned between the adjacent staggered rows whereby a substantial length of the leader line is in retaining engagement with said adjacent staggered rows of posts; and
   e. means on said means for covering and uncovering said container and engageable with said wall means for retaining said container covering means in a closed position.

2. A hook and leader storage structure comprising:
   a. a base section having an outer wall and wall means extending outwardly therefrom, said base section wall means comprising laterally spaced front and rear walls and a pair of longitudinally spaced end walls each extending from said base section outer wall and each having a free edge, said base section front wall having a recess in an exterior surface thereof;
   b. an upper section having an outer wall and wall means extending outwardly therefrom, said upper section wall means comprising laterally spaced front and rear walls and a pair of longitudinally spaced end walls each extending from said upper section outer wall and each having a free edge, said upper section front wall having a recess in an exterior surface thereof;
   c. a partition separating said base section and said upper section, said partition being hingedly mounted on said rear wall of said base section and on said rear wall of said upper section;
   d. means in each said base section and said upper section and spaced from one of said end walls thereof for supporing a plurality of fishing hooks, said means for supporting fishing hooks being positioned adjacent and spaced from said respective end wall and comprising spaced end posts each extending from said respective outer wall and each positioned adjacent a respective one of said section front and rear walls and a rack extending between said end posts, said racks each being adapted to support a shank portion of each fishing hook with a barbed portion thereof positioned between said respective outer wall and said rack;
   e. means in each said base section and said upper section and spaced from said means for supporting a plurality of spaced fishing hooks therein for engaging and retaining a plurality of leader lines each attached to a respective one of the fishing hooks, said means for engaging and retaining leader lines comprising a plurality of laterally spaced rows of longitudinally spaced flexible posts extending from said respective outer wall, said rows being in close proximity one with the other, each of said rows having a plurality of posts, said posts in each of said rows each being in longitudinally staggered relation with adjacent posts in adjacent rows of posts, said posts in adjacent staggered rows of posts each being positioned to be engaged by a leader line positioned between the adjacent staggered rows whereby a substantial length of the leader line is in retaining engagement with said adjacent staggered rows of posts; and
   f. means on said partition and engageable with said walls means of said base section and with said wall means of said upper section for retaining said partition and said base and upper sections in a closed position, said means for retaining said partition and said base and upper sections in a closed position comprising a catch member on said partition and having respective portions received in said recess in said base section front wall and in said upper section front wall for retaining said partition and said base section and said upper section in a closed position.

3. A hook and leader storage structure as set forth in claim 2 wherein:
   a. said rear wall of said base section has a plurality of longitudinally spaced tubular members extending outwardly from a free edge thereof;
   b. said rear wall of said upper section has a plurality of longitudinally spaced tubular members extending outwardly from a free edge thereof and longitudinally aligned with said tubular members extending from said rear wall of said base section;

c. said partition is a generally planar member having a plurality of longitudinally spaced tubular members extending from one edge thereof and longitudinally aligned with said tubular members extending from said rear wall of said base and upper sections; and d. a pin extends longitudinally through said tubular members extending from said partition and from said base and upper sections whereby said partition and said upper section are hingedly mounted relative to said base section.

* * * * *